United States Patent
Knight

[15] 3,671,498
[45] June 20, 1972

[54] COPOLYAMIDES FROM BIS(AMINOPHENYL)SULFONE

[72] Inventor: Michael Horace Knight, Runcorn, England
[73] Assignee: Imperial Chemical Industries Limited, London, England
[22] Filed: April 17, 1970
[21] Appl. No.: 29,699

[30] Foreign Application Priority Data

May 2, 1969 Great Britain.....................22,508/69

[52] U.S. Cl..................260/78 R, 260/29.2 N, 260/30.2, 260/30.6 R, 260/30.8 R, 260/32.6 N, 260/37 N, 260/476 Z, 260/65, 260/78 S, 260/78 SC
[51] Int. Cl..........................................C08g 20/20
[58] Field of Search .............................260/78 R

[56] References Cited

UNITED STATES PATENTS

| | | | |
|---|---|---|---|
| 3,206,438 | 9/1965 | Jamison | 260/78 R |
| 3,322,728 | 5/1967 | Hill et al. | 260/78 R |
| 3,505,296 | 4/1970 | Burrows et al. | 260/78 R |

*Primary Examiner*—Harold D. Anderson
*Attorney*—Cushman, Darby & Cushman

[57] ABSTRACT

The color of polyamides of bis(aminophenyl)sulphones and α,ω-polymethylene dicarboxylic acids having from six to 16 carbon atoms in all, or mixtures of these acids with up to 25 mole percent of one or more other dicarboxylic acids, may be improved by replacing from 4 to 20 mole percent of the bis(aminophenyl)sulphone with a linear or branched alkylene diamine having the structure $NH_2CH_2(CR_1R_2)_mCH_2NH_2$ where each $R_1$ and $R_2$ is hydrogen or an alkyl group having up to four carbon atoms and $m$ is from 0 to 10 inclusive.

8 Claims, No Drawings

COPOLYAMIDES FROM BIS(AMINOPHENYL)SULFONE

This invention relates to copolyamides based on bis(aminophenyl) sulphones and α,ω-polymethylene dicarboxylic acids.

High molecular weight polyamides of bis(aminophenyl)sulphones and α,ω-polymethylene dicarboxylic acids containing at least six, and preferably from six to 16, carbon atoms (including carboxy carbon atoms) are known. The possibility of replacing some of the bis(aminophenyl)sulphone residues in the macromolecular chains by the residues of other diamines, e.g., m-phenylene diamine and 4,4'-diaminodiphenyl ether is also known.

These polyamides have a very desirable combination of properties for thermoplasts. They are essentially amorphous and substantially non-crystallizable materials having unexpectedly high softening points and yet their resistance to thermal degradation and oxidation is such that they can be molded or extruded in the heat-softened state on conventional thermoplastic molding machinery to give useful shaped products, and these products retain their room temperature strength to a marked degree at elevated temperatures, e.g., of 140° C. or even above.

We have now found that if a small number of the bis(aminophenyl) sulphone residues are replaced by certain alkylene diamine residues, a marked improvement in the color of the products can be obtained without any serious deterioration in other properties, particularly in the case of those products made by direct amidation (i.e., by reaction of the diamine with the diacid) Moreover, the products also tend to have lower melt viscosities than the corresponding homopolymers and may therefore be more easily processed on conventional extrusion and injection-molding equipment to give films, fibers or molded articles.

According to the present invention, we provide a copolyamide having a reduced viscosity, measured on a solution of 1 g of polymer in 100 ml of 5 percent by weight solution of lithium chloride in dimethylformamide at 25° C. of at least 0.5 $dl.g^{-1}$ and preferably from 0.8 to 2.0 $dl.g^{-1}$, and formed of macromolecular chains consisting essentially of repeat units having the structure — NH — Z — NHCO — Z — CO — where Z is selected from

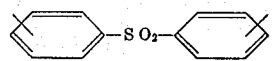  I and

— $CH_2(CR_1R_2)_mCH_2$ —  II where $R_1$ and $R_2$ are each selected from the group consisting of hydrogen atoms and alkyl groups having not more than four carbon atoms, $m$ is a whole number of from 3 to 10, and Z has the structure II in from four to 20 percent of the said units, and Z is a direct link or a divalent organic group and is $(CH_2)_n$, where $n$ is a whole number of from four to 14, in at least 75 percent, and preferably all, of the repeat units.

According to a further embodiment of the invention, we provide a copolyamide of the kind defined in the previous paragraph but wherein $m$ is a whole number of from 0 to 2 inclusive.

If the percentage of repeat units wherein Z has the structure II is less than four, little of no useful improvement in color may be obtained. On the other hand, little or no further observable benefit appears to be obtained at percentages above 20 and indeed some deleterious effects such as drop in softening point and/or difficulty in achieving high molecular weight products may be introduced. A very useful color improvement is obtained at values of from 5 to 10 percent. The preferred percentage, however, may depend not only upon the color improvement that is obtained but also on the desired melt viscosity of the product, which, as stated above, may also be advantageously reduced by the incorporation of the units of the Structure II. The reductions in melt viscosity that have been observed are generally greater at the lower values for $n$, e.g., where $n$ is from 4 to 7 and especially where $n$ is 4. For these lower values, it is preferred that Z has structure II in at least 8 percent and preferably from 8 to 18 percent of the repeat units.

Examples of divalent groups having the Structure II are ethylene, trimethylene, pentamethylene, hexamethylene, heptamethylene, octamethylene, nonamethylene, decamethylene, undecamethylene, dodecamethylene, 2,2,4-trimethylhexamethylene, 2,4,4,-trimethylhexamethylene and 2-ethylhexamethylene.

The copolyamides of our invention may be derived from a diamine component consisting essentially of a mixture of 80 to 96 mole percent of at least one bis(aminophenyl)sulphone and 20 to 4 mole percent of at least one aliphatic diamine having the structure.

$$H_2NCH_2(CR_1R_2)_mCH_2NH_2$$

where $R_1$, $R_2$ and $m$ have the possibilities described above, and a diacid component consisting essentially of at least one α,ω-polymethylene dicarboxylic acid having from 4 to 14 and preferably 4, 5, 6, 7,8, 10 or 12 methylene groups although a portion up to about 25 mole percent of this acid may be replaced by other dicarboxylic acid or acids if desired.

Examples of acids that may be used to replace the specified polymethylene dicarboxylic acids are branched and cyclic aliphatic dicarboxylic acids, dicarboxylic acids having the structure $HOOC(CH_2)_nCOOH$ where $n$ is from 0 to 3, mononuclear aromatic acids, e.g., isophthalic acid, terephthalic acid, and substituted derivatives of these acids wherein one or more of the hydrogen atoms attached to the benzene ring may be replaced by, for example, alkyl groups, alkoxy groups and halogen atoms, and dinuclear aromatic dicarboxylic acids, e.g., naphthalene dicarboxylic acids, acids having the structure

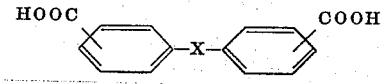

where X is a direct link or a divalent atom or group, e.g., —O—, —S—, —S—S—, —SO—, —$SO_2$—, —CO—, —ORO—, —R'—, and —NR"— where R is a divalent hydrocarbon group having at least two carbon atoms in a chain linking the oxygen atoms and preferably not more than six carbon atoms in all, R' is a divalent hydrocarbon group having from one to 16 carbon atoms, preferably —($CR_3R_4$)— where each of $R_3$ and $R_4$ is a hydrogen atom or a monovalent hydrocarbon group having from one to six carbon atoms or $R_3$ and $R_4$ together form a divalent hydrocarbon group, e.g., —($CH_2$)$_5$—, and R" is a monovalent hydrocarbon group having from one to six carbon atoms, and substituted derivatives of these acids wherein one or more of the hydrogen atoms attached to the benzene rings may be replaced by, for example, alkyl groups, alkoxy groups and halogen atoms.

The copolyamides of our invention are most preferably prepared by a melt polycondensation process. An alternative method, which is less preferred because of its expense and because of the technical difficulties surrounding the recovery of polymer of adequate molecular weight, involves mixing the diamines with the diacid component in the form of its di(acid halide) in the presence of an acid acceptor and in solution in an organic medium, e.g., N,N-dimethyl-acetamide or N-methylpyrrolidone, which is a solvent for both the reagents and has a swelling or at least partial solvation action on the polymeric product.

In accordance with the preferred melt polycondensation process, the copolyamides may be prepared by heating the diamine component (which will normally comprise the mixture of diamines but may also comprise amide forming derivatives, e.g., salts, thereof) with a substantially equimolar proportion of the diacid component (which will normally comprise the diacid or mixture of diacids but may also comprise amide forming derivatives, e.g., esters, thereof) at elevated temperature and in the presence of a suitable catalyst until the desired molecular weight is obtained. The reaction mixture of diamine and diacid components may be heated at a temperature of from 160° to 300° C. under an inert atmosphere and in the presence of a catalytic amount of a salt hypophosphorous acid and an organic base having a $pK_a$ of less than 3.0 and preferably less than 2.5, the salt being added to the mixture before the latter reaches a temperature of 150° C. The organic base is most suitably a bis(aminophenyl)sulphone in which case the salt may be formed in situ in the reaction mixture by including therein hypophosphorous acid or a compound or mixture of compounds which will produce that acid in the reaction mixture before it reaches 150° C. The catalyst may be present in an amount of from 0.005 to 3 percent by weight of the mixture of diamine and diacid components, and preferably in an amount of from 0.01 to 1 percent. Preferably, the reaction is effected in two stages, the first being at a temperature of from 160° to 240° C. and the second at a higher temperature, in the range 220° to 270° C. and under a vacuum which is preferably equivalent to an absolute pressure of 1 millimeter of mercury or less.

The copolyamide products of the process, which have a reduced viscosity as hereinbefore defined of at least 0.5 dl. $g^{-1}$, will generally contain at least 150 and possibly as much as 250 microequivalents of acid residues per gram (measured by the potentiometric titration of a solution of about 1 g of the polymer in 100 ml of N,N-dimethylacetamide against 0.05N aqueous potassium hydroxide), depending upon the method of manufacture, and it may be found desirable to reduce this acid content in order to improve their high temperature performance such as melt stability and resistance to boiling water. This may be achieved, for example, by using an excess of the diamine component over the diacid component in the polymerization reaction mixture and/or by including a monofunctional primary or secondary amine. In the latter case, it is preferred to avoid the use of those amines, e.g., the simple aromatic amines, which tend to discolor at elevated temperatures. Examples of suitable amines are monoaminodiphenyl sulphones and aliphatic amines, e.g., benzylamine, n-hexylamine, n-decylamine and n-octadecylamine.

As both of the above-mentioned methods of reducing the concentration of acid residues also tend to reduce the molecular weight of the product, a compromise has to be achieved between the two. In general, it is preferred that the number of primary and secondary amine groups in the polymerization reaction mixture does not exceed the number of carboxylic acid groups by more than about 10 percent.

An alternative or additional method of reducing the acid content comprises reacting the copolyamide with an isocyanate, epoxide and/or monofunctional primary or secondary amine.

Any amine and groups on the polymer chains may be neutralized, if desired, e.g., by acylation. For example, the copolyamide may be reacted with acetyl chloride.

Like the homopolyamides of bis(aminophenyl)sulphones and α,ω-polymethylene dicarboxylic acids from which they are derived, the copolyamides of our invention are generally amorphous and substantially non-crystallizable, strong, tough thermoplasts having remarkably high softening points. But they have better color and generally lower melt viscosities and may therefore be more easily shaped in heat softened form into molded articles, film and fibers, for example by extrusion, molding or vacuum forming using conventional equipment for hot shaping thermoplastic materials. Alternatively, they may be dissolved in suitable solvents, for example dimethylformamide; N,N-dimethylacetamide, tetramethylene sulphone, tetramethyl urea, dimethylsulphoxide, N-methylpyrrolidone and hexamethylphosphoramide, and films, filaments and fibers, which are generally transparent and of improved color, may be obtained from the solutions. Such films, filaments and fibers may be drawn if desired.

The shaped products obtained from the copolyamides of the invention are generally amorphous, strong and tough and their room temperature strength is retained to a remarkable degree at elevated temperatures even approaching the full Vicat softening points of the polymers, themselves unexpectedly high. The products are also resistant to corrosive atmospheres, both acid and alkaline, and they resist embrittlement either by prolonged exposure to elevated temperatures or by exposure to most common organic solvents.

The copolyamides of our invention also show useful dielectric properties. Thus, in the form of film, they may be used as decorative trim, slot liners in electrical motors, insulation in transformers, capacitors, cables and the like. They may also be molded, for example, into corrosion resistant pipe or into containers. Solutions of the polymers may be used as coatings, varnishes and adhesives and for coating wire, fabric and the like. Fibers formed from the polymers, for example by spinning from solution, may be woven into fabric, for example for making protective clothing or filters, or may be formed into woven electrical sheathing. Organic and aqueous dispersions of the copolyamides may also be prepared for use, for example, in the production of surface coatings.

Our preferred copolyamides are those derived from mixtures of 80 to 96 mole percent of bis(4-aminophenyl)sulphone and/or bis(3-aminophenyl) sulphone (but preferably bis(4-aminophenyl)sulphone alone) and 20 to 4 mole percent of one or more polymethylene diamines having from 2 to 12 methylene groups, with one or more of adipic, pimelic, suberic, azelaic, sebacic, 1,10-decanedicarboxylic and 1,12-dodecane dicarboxylic acids, optionally in admixture with one or both of isophthalic and terephthalic acids. The much preferred acids are adipic acid, the copolyamides of which are particularly suitable for molding, and azelaic and 1,10 - decanedicarboxylic acids, the copolyamides of each which are excellent fiber-forming materials. Particularly preferred copolyamides of this invention are those of (i) bix(4bis((ii) hexamethylene diamine and (iii) adipic acid, azelaic acid or 1,10-decanedicarboxylic acid.

The polymers of the present invention may be further modified by the inclusion in the polymerization reaction mixture of small amounts of reactive monofunctional materials to act as molecular weight regulators, and/or small amounts of reactive trifunctional or higher polyfunctional materials, for example 4,4'-diaminodiphenylamine, 2,4,4'-triaminodiphenyl sulphone or 3,3'-diaminobenzidine, to act as chain branching and cross linking agents. Amounts up to about 5 mole percent may be used, for example.

The polyamides of the present invention may, if desired, have mixed therewith additives such as, for example, heat and light stabilizers, lubricants, plasticizers, pigments, dyes, mold release agents and fillers such as glass fibers, asbestos fiber, carbon fiber finely powdered metals or metal oxides, graphite, carbon black, ground glass and molybdenum disulphide, and may be blended with other polymeric materials, natural or synthetic.

This invention is now illustrated but in mo way limited to the following examples in which all parts are expressed as parts by weight unless otherwise stated. The bis(4-aminophenyl)sulphone used in the examples was that sold under the trade name "Dapsone B.P." by Imperial Chemical Industries and the azelaic acid was that sold under the trade name "Emerox 1144" by Emery Chemical Company (molecular weight 190.2).

EXAMPLE 1.

446.4 parts of bis(4-aminophenyl)sulphone, 262.8 parts of adipic acid, 52.4 parts of nylon 6.6 salt and 1.6 parts of hypophosphorous acid were placed in an autoclave fitted with a stirrer, a temperature pocket, a nitrogen inlet, vacuum take off, and outlet at the base. Polymerization was effected under nitrogen. The reaction mixture was heated at 200° C. for 1 hour, then at 230° C. for 1 hour. A vacuum equivalent to an absolute pressure of 0.5 mm of Hg was then applied and the temperature of the mixture raised to 260° C. over a period of 30 minutes. The polymerization was completed by maintaining the vacuum at this temperature for an additional 1 hour. The polymerization vessel was then heated to 270° and the polymer extruded from the autoclave by applying a slight pressure of nitrogen. The polymer was a pale straw yellow in color and had a reduced viscosity of 0.59.

Its melt viscosity, determined with a motor-driven capillary viscometer at 270° C. and at the shear rate of 50 sec$^{-1}$ was found to be 9 kilopoise.

By way of comparison, the polymerization process was repeated using 496.6 parts of the diamine, and 292.0 parts of adipic acid and no salt. Polymerization was effected under nitrogen using the following conditions: 200° C. for 1 hour, 220° C. for 1 hour, temperature increased to 270° C. over a period of 2 hours, a vacuum corresponding to an absolute pressure of 0.5 mm of Hg applied and polymerization continued at this pressure and a temperature of 270° C. for a further 2 hours. Extrusion of the polymer from the autoclave was difficult owing to its high melt viscosity (about 84 kilopoise at 270° C. and a shear rate of 50 sec$^{-1}$). The product had a reduced viscosity of 0.57 dl.g$^{-1}$ and was much darker in color than the copolymer, being a deep shade of yellow.

EXAMPLE 2

421.6 parts of 4,4'-diaminodiphenyl sulphone, 248.2 parts of adipic acid, 79.2 parts of nylon 6,6 salt and 1.6 parts of hypophosphorous acid were polymerized using the apparatus and conditions described for the copolymer in Example 1.

The polymer was extruded from the autoclave with ease. It was a light yellow and tough and had a reduced viscosity of 0.68 dl.g$^{-1}$, a glass transition temperature (Tg) as measured by differential thermal analysis of 157° C. and a melt viscosity measured using a motor-driven capillary viscometer at 270° C. and shear rate of 50 sec$^{-1}$ of 13 kilopoise.

EXAMPLE 3.

22.35 parts of bis(4-aminophenyl)sulphone, 2.0 parts of 1,12-dodecamethylene diamine, 14.6 parts of adipic acid and 0.04 part of hypophosphorous acid were charged at a two-necked cylindrical glass polymerization vessel fitted with a nitrogen inlet tube and a vacuum off-take. Polymerization was effected under nitrogen by heating the mixture at 200° C. for 1 hour, then at 230° C. for 1 hour. A vacuum equivalent to an absolute pressure of 0.5 mm Hg was then applied and the temperature of the mixture was raised to 260° C. over a period of 15 minutes and polymerization was completed by maintaining this temperature and vacuum for 2 hours. A slow stream of nitrogen was passed through the melt during the polymerization and the flow rate was adjusted near the completion of the polymerization so that a foamed mass was obtained. The polymer was a pale yellow in color and had a glass transition temperature, as determined by differential thermal analysis, of 168° C.

Its melt viscosity, determined with a motor-driven capillary viscometer at 270° C. and at a shear rate of 50 sec$^{-1}$ was found to be 50 kilopoise and the reduced viscosity of the extrudate was 0.65 dl.g$^{-1}$.

EXAMPLE 4.

22.35 parts of bis(4-aminophenyl)sulphone, 2.0 parts of 1,12-dodecamethylene diamine, 19.2 parts of azelaic acid and 0.04 part of hypophosphorous acid were charged to a two-necked cylindrical glass polymerization vessel and polymerized according to the procedure outlined in Example 3. The polymer was water white and tough. It has a glass transition temperature, as determined by differential thermal analysis, of 147° C. and a melt viscosity at 270° C. and at a shear rate of 50 sec$^{-1}$ of 11.6 kilopoise. The reduced viscosity of the polymer was 0.76 dl.g$^{-1}$. By way of comparison, a homopolymer of bis(4-aminophenyl)sulphone and azelaic acid prepared under similar reaction conditions was deep yellow.

EXAMPLE 5.

471.2 parts of bis(4-aminophenyl)sulphone, 11.6 parts of 1,6-hexamethylene diamine, 380.0 parts of azelaic acid and 3.0 parts of hypophosphorous acid were placed in an autoclave and polymerized according to the procedure described in Example 1. The polymer, which was extruded from the autoclave, was pale yellow in color and its melt viscosity, determined with a motor-driven capillary viscometer at 270° C. and at a shear rate of 50 sec$^{-1}$ was 50 kilopoise. The reduced viscosity of the extrudate was 0.99 dl.g$^{-1}$. A homopolymer of bis(4-aminophenyl)sulphone and azelaic acid prepared under similar reaction conditions was deep yellow.

EXAMPLE 6

23.56 parts of dry bis(4-aminophenyl)sulphone, 0.58 part of hexamethylene diamine, 19.20 parts of azelaic acid and 0.04 part of hypophosphorous acid were mixed together in a polymerization tube under an atmosphere of nitrogen. The mixture was heated in a fluidized sand bath at 180° C. After melting, the reactants were agitated by passing a rapid current of nitrogen through the mixture.

Heating was continued at this temperature for 30 minutes. The temperature was then raised to 220° C. for 30 minutes and finally to 260° C. for 60 minutes. Vacuum was then gradually applied and heating at this temperature was continued for a further 3 hours.

The final product was a rapid, tough polymer which was a very pale straw color. The reduced viscosity measured on a solution of 1g of polymer in 100 ml. of a 5 percent solution of lithium chloride in dimethylformamide at 25° C. was 1.01 dl.g$^{-1}$. The homopolymer of bis(4-aminophenyl)sulphone and azelaic acid prepared under similar conditions was a deep yellow in color.

EXAMPLE 7. 471.2 parts (95 mole percent) of dry bis(4-aminophenyl)sulphone, 11.6 parts (5 mole percent) of hexamethylene diamine, 346.0 parts (90 mole percent) of azelaic acid and 33.6 parts (10 mole percent) of isophthalic acid were mixed with 3.6 parts of a 50 percent by weight aqueous solution of hypophosphorous acid and heated in a glass polymerization vessel at 180° to 200° C. under a slow stream of nitrogen for 1 hour. The melt was then transferred to an autoclave preheated to 250° C. and the temperature was raised to 260° C. 1 hour later. Vacuum was then slowly applied until the absolute pressure was reduced to about 0.5 mm of Hg and the reaction was continued under these conditions for a further 3½ hours. The resulting product was extruded from the autoclave under nitrogen. It had a reduced viscosity of 0.66 dl.g$^{-1}$.

In a second experiment, the process was repeated but using bis(4-aminophenyl)sulphone as the sole diamine component.

The product of the first experiment was paler in color than that of the second.

EXAMPLE 8.

24.8 parts of bis(4-aminophenyl)sulphone, 20.9 parts of azelaic acid and 0.6 part of ethylene diamine were blended by shaking the mixture vigorously for 5 minutes at room temperature. 0.3 part of a 50 percent aqueous solution of hypophosphorous acid was then added and the blending procedure repeated. The mixture was then placed in a glass polymerization vessel equipped with a nitrogen inlet, and heated under a slow stream of nitrogen at 205° C. until a clear, very pale straw colored melt was obtained. The nitrogen inlet tube was immersed in this melt to obtain good agitation by bubbling nitrogen through the melt and heating was continued for a further 30 minutes. The temperature was then raised to 230° C. and held there for 60 minutes. Vacuum was then applied progressively over a period of 30 minutes and the temperature was raised to 265° C. Polymerization was completed at 280° C. and an absolute pressure of 0.3 mm of Hg for 2½ hours.

The product had a reduced viscosity of 0.71 dl.g$^{-1}$.

EXAMPLE 9.

471.2 parts (95 molar parts) of bis(4-aminophenyl)sulphone, 11.6 parts (5 molar parts) of hexamethylene diamine, 380.0 parts (100 molar parts) of azelaic acid and 10.6 parts (4 molar parts) of n-octadecylamine were mixed together and 3.6 parts of 50 weight percent aqueous hypophosphorous acid was added. The mixture was melted under an atmosphere of nitrogen and kept at approximately 200° for 1½ hours. The melt was then poured into a polymerization autoclave preheated to 220° C. The reaction temperature was raised to 260° C. over 1½ hours and then a vacuum was slowly applied until an absolute pressure of 0.1 mm of Hg was obtained. The reaction mixture was stirred under these conditions for 2¾ hours and the polymer was then extruded as a pale yellow rod with a reduced viscosity of 0.98 dl.g$^{-1}$.

EXAMPLE 10.

23.56 parts (95 molar parts) of bis(4-aminophenyl)sulphone, 0.79 part (5 molar parts) of a mixture of 2,2,4- and 2,4,4-trimethylhexamethylene diamines (ex Solven Chemie AG), 19.0 parts (100 molar parts) of azelaic acid and 0.11 part of 50 weight percent aqueous hypophosphorous acid were heated at 200° for one-half hour under a slow stream of nitrogen. The very pale melt was then heated at 260° for 1 hour with agitation by a slow stream of nitrogen. Vacuum was slowly applied and the melt was kept at 260° and an absolute pressure of 0.4 mm of Hg for 6 hours while foaming slowly occurred. The melt was then allowed to cool under an atmosphere of nitrogen and a pale yellow product having a reduced viscosity of 1.00 dl.g$^{-1}$ was obtained.

What we claim is:

1. A copolyamide having a reduced viscosity, measured on a solution of 1g of polymer in 100 ml of a 5 percent by weight solution of lithium chloride in dimethylformamide at 25° C., of at least 0.5 dl. g$^{-1}$, and formed of macromolecular chains consisting essentially of repeat units having the structure —NH—Z'—NHCO—Z—CO— where Z' is a mixture of

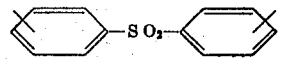

and

—CH$_2$(CR$_1$R$_2$)$_m$CH$_2$— II where R$_1$ and R$_2$ are each selected from the group consisting of hydrogen atoms and alkyl groups having not more than four carbon atoms, $m$ is a whole number of from 3 to 10, and Z' has the structure II in from 4 to 20 percent of the said units, and Z is (III) $(CH_2)_n$, where $n$ is a whole number of from 4 to 14, or mixture thereof with (IV) aromatic carbocyclic radical, Z being the structure (III) in at least 75 percent of said units.

2. A copolyamide as claimed in claim 1 in which Z is $(CH_2)_n$ in all the repeat units.

3. A copolyamide as claimed in claim 1 in which $n$ is 4, 7 or 10.

4. A copolyamide as claimed in claim 1 in which $n$ is from four to seven and Z has the structure II in from 8 to 18 percent of the repeat units.

5. A copolyamide as claimed in claim 1 which is a copolymer of (i) bis(4-aminophenyl)sulphone, (ii) hexamethylene diamine, and (iii) adipic acid, azelaic acid or 1,10-decanedicarboxylic acid.

6. A copolyamide as claimed in claim 1 in which $m$ is a whole number of from 0 to 2 inclusive.

7. A copolyamide as claimed in claim 1 in which the concentration of acid residues is less than 150 microequivalents per gram of polymer.

8. A film or fiber of the copolyamide as claimed in claim 1.

* * * * *